US010163273B2

(12) United States Patent
Boll et al.

(10) Patent No.: US 10,163,273 B2
(45) Date of Patent: Dec. 25, 2018

(54) METHOD AND SYSTEM FOR OPERATING MOBILE APPLICATIONS IN A VEHICLE

(75) Inventors: David P. Boll, Grosse Pointe Park, MI (US); Nello Joseph Santori, Canton, MI (US); Thomas Richard Alexander, Canton, MI (US); Joseph N. Ross, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1697 days.

(21) Appl. No.: 12/891,993

(22) Filed: Sep. 28, 2010

(65) Prior Publication Data

US 2012/0079002 A1    Mar. 29, 2012

(51) Int. Cl.
*G07C 5/00* (2006.01)
*G06F 9/451* (2018.01)

(52) U.S. Cl.
CPC ............. *G07C 5/008* (2013.01); *G06F 9/452* (2018.02)

(58) Field of Classification Search
CPC .............................. G06F 9/4445; G07C 5/008
See application file for complete search history.

(56) References Cited

U.S. PATENT DOCUMENTS

| | | | |
|---|---|---|---|
| 6,526,335 B1 * | 2/2003 | Treyz et al. ...................... 701/1 |
| 7,207,041 B2 | 4/2007 | Elson et al. | |
| 7,266,435 B2 | 9/2007 | Wang et al. | |
| 7,505,784 B2 | 3/2009 | Barbera | |
| 7,602,782 B2 | 10/2009 | Doviak et al. | |
| 7,801,941 B2 | 9/2010 | Conneely et al. | |
| 8,131,458 B1 | 3/2012 | Zilka | |
| 2002/0098853 A1 | 7/2002 | Chrumka | |
| 2003/0079123 A1 | 4/2003 | Mas Ribes | |
| 2003/0147534 A1 * | 8/2003 | Ablay et al. ................... 380/270 |

(Continued)

FOREIGN PATENT DOCUMENTS

| | | |
|---|---|---|
| CN | 101262496 A | 9/2008 |
| JP | 2001222349 A | 8/2001 |

(Continued)

OTHER PUBLICATIONS

Ford Motor Company, "Navigation System: SYNC," Owner's Guide Supplement, SYNC Version 1 (Jul. 2007).

(Continued)

*Primary Examiner* — Jackie Zuniga Abad
(74) *Attorney, Agent, or Firm* — Jennifer Stec; Brooks Kushman P.C.

(57) ABSTRACT

In various embodiments, a user interacts with remotely executing mobile applications from a vehicle. The vehicle may include at least one computer that includes a human machine interface (HMI) for control by the user. The mobile applications may be executing on an application server that is remote from the vehicle and communicating with the at least one computer. Further, the mobile applications may be configured to receive inputs from and transmit outputs to the at least one computer. An HMI application executing on the at least one computer may enable the provisioning of one or more services of the HMI to the mobile applications so that inputs and/or outputs to the mobile applications may be exchanged. Vehicle-based operation of the mobile applications from the at least one computer via the HMI may thus be enabled.

4 Claims, 3 Drawing Sheets

(56) References Cited

U.S. PATENT DOCUMENTS

| | | | |
|---|---|---|---|
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |
| 2006/0287821 A1* | 12/2006 | Lin | 701/213 |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0132572 A1 | 6/2007 | Itoh et al. | |
| 2007/0294625 A1 | 12/2007 | Rasin et al. | |
| 2008/0007120 A1 | 1/2008 | Weyl et al. | |
| 2008/0148374 A1 | 6/2008 | Spaur et al. | |
| 2008/0220718 A1 | 9/2008 | Sakamoto et al. | |
| 2008/0313050 A1 | 12/2008 | Basir | |
| 2009/0075624 A1 | 3/2009 | Cox et al. | |
| 2009/0106036 A1 | 4/2009 | Tamura et al. | |
| 2009/0117890 A1 | 5/2009 | Jacobsen et al. | |
| 2009/0140064 A1 | 6/2009 | Schultz et al. | |
| 2009/0156182 A1 | 6/2009 | Jenkins et al. | |
| 2009/0228908 A1 | 9/2009 | Margis et al. | |
| 2009/0253466 A1 | 10/2009 | Saito et al. | |
| 2009/0318119 A1 | 12/2009 | Basir et al. | |
| 2010/0063670 A1 | 3/2010 | Brzezinski et al. | |
| 2010/0094996 A1 | 4/2010 | Samaha | |
| 2010/0098853 A1 | 4/2010 | Hoffmann et al. | |
| 2010/0157061 A1 | 6/2010 | Katsman et al. | |
| 2010/0216509 A1 | 8/2010 | Riemer et al. | |
| 2010/0234071 A1* | 9/2010 | Shabtay et al. | 455/562.1 |
| 2010/0306309 A1 | 12/2010 | Santori et al. | |
| 2011/0087385 A1 | 4/2011 | Bowden et al. | |
| 2011/0105097 A1 | 5/2011 | Tadayon et al. | |
| 2011/0112762 A1 | 5/2011 | Gruijters et al. | |
| 2011/0185390 A1 | 7/2011 | Faenger et al. | |
| 2011/0195659 A1 | 8/2011 | Boll et al. | |
| 2011/0267317 A1 | 11/2011 | Tsuda | |
| 2011/0275358 A1 | 11/2011 | Faenger | |
| 2011/0296037 A1 | 12/2011 | Westra et al. | |
| 2012/0054300 A1 | 3/2012 | Marchwicki et al. | |
| 2012/0064917 A1 | 3/2012 | Jenkins et al. | |
| 2012/0065815 A1 | 3/2012 | Hess | |
| 2012/0079002 A1 | 3/2012 | Boll et al. | |
| 2012/0084292 A1 | 4/2012 | Liang et al. | |

FOREIGN PATENT DOCUMENTS

| | | |
|---|---|---|
| JP | 2002244947 A | 8/2002 |
| JP | 2009121879 A | 6/2009 |
| JP | 2010127781 A | 6/2010 |

OTHER PUBLICATIONS

Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Kermit Whitfield, "A hitchhiker's guide to the telematics ecosystem", Automotive Design & Production, Oct. 2003, http://findarticles.com, pp. 1-3.
International Searching Authority, Korean Intellectual Property Office, International Search Report for the corresponding PCT Application No. PCT/US2011/053342 dated Apr. 19, 2012.
Narasimhan, et al., A lightweight remote display management protocol for mobile devices, Application Research Center, Motorola Labs Schaumburg, IL, 2007, pp. 711-715.
Voelcker, Top 10 Tech Cars It's the Environment, Stupid, www.SPECTRUM.IEEE.ORG, Apr. 2008, pp. 26-35.
Yarden, et al., TUKI: A Voice-Activated Information Browser, IEEE, 2009, pp. 1-5.
Gil-Castineira, et al., Integration of Nomadic Devices with Automotive User Interfaces, IEEE Transactions on Consumer Electronics, vol. 55, No. 1, Feb. 2009.
Nusser, et al., Bluetooth-based Wireless Connectivity in an Automotive Environment, Robert Bosch GmbH, VTC 2000, pp. 1935-1942.
Antuan Goodwin, The Car Tech Blog, Ford Unveils open-source Sync developer platform, http://reviews.cnet.com/8301-13746_7-10385619-48.html, Oct. 2009, pp. 1-5.
Service Discovery Protocol (SDP) Layer Tutorial, Palowireless Bluetooth Research Center, http://www.palowireless.com/infotooth/tutorial/sdp.asp. Aug. 3, 2010.
"MobileSafer is your personal safe driving assistant", 2010 ZoomSafer Inc. <http://zoomsafer.com/products/mobilesafer> Dec. 28, 2010.
"How PhonEnforcer Works" Turn Off the Cellphone While Driving—honEnforcer. Turn Off the Cell Phone LLC. <http://turnoffthecellphone.com/howitworks.htm> Dec. 28, 2010, pp. 1-3.
"PhonEnforcer FAQ's" Turn Off the Cellphone While Driving—PhonEnforcer. Turn Off the Cell Phone LLC. <http://turnoffthecellphone.com/faq.html> Dec. 28, 2010, pp. 1-2.
Lamberti, Ralph "Daimler Full Circle: The Rise of Vehicle-Installed Telematics—Telematics Munich 2009" Nov. 10, 2009.
IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.
Zack Newmark, American, Concept Car, Ford, Gadgets, Lifestyle, Technology, Student develop in-car cloud computing apps; envision the future of in-car connectivity, May 4, 2010, http://www.woldcarfans.com/print/110050425986/student-develop-in-car-cloud-computing_apps_;_envision_the_future_of_in-car_connectivity.
What is X Window System?—Definition from Whatis.com,, http://searchenterpriselinux.techtarget.com/sDefinition/o,,sid39_gci213409,00.html, Jun. 22, 2010.
Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.
Wikipedia, the free encyclopedia, X Window System, http://en.wikipedia.org/wiki/X_Window_System, Jun. 22, 2010.
Chinese Patent Office, Third Office Action for the corresponding Chinese Patent Application No. 201180045289.3, dated May 4, 2016.
Chinese Patent Office, First Office Action for the corresponding Chinese Patent Application No. 201180045289.3 dated Mar. 4, 2015.

* cited by examiner

METHOD AND SYSTEM FOR OPERATING MOBILE APPLICATIONS IN A VEHICLE

BACKGROUND

1. Technical Field

Various embodiments relate to vehicle based operation of mobile applications stored on a remote server. In some embodiments, a system and method enable the "remoting" of the services of the human machine interface (HMI) of a vehicle computing system to the mobile application to enable application operation.

2. Background Art

It is not uncommon that owners of the IPHONE, BLACKBERRY, and other such nomadic devices, will have at least one mobile application stored on their device. There is virtually a limitless selection of applications that a user can download to a nomadic device. As such, these devices can suffer in performance due to the limited storage space on the nomadic device.

Further, some nomadic devices only permit a user to run mobile applications one at a time. On the other hand, for those devices that permit concurrent use of mobile applications, the performance of the device is negatively affected. For example, the processing on these devices is much slower than if no application or only one application was running.

Many vehicles today include a telematics system, such as the SYNC system from THE FORD MOTOR COMPANY. In some instances, these telematics systems may enable a user to use mobile applications stored on a nomadic device through interaction with the human machine interface (HMI) of the telematics system. When mobile applications are used in the vehicle, performance and security of the telematics system is integral for driver's safety. A driver cannot be concerned with poor performance of the telematics system or security affecting operation of the vehicle while driving.

Various suggestions have been offered in the art to enable the use of applications from a vehicle. For example, U.S. Publication No. 2010/0094996 to Samaha discloses a system and method for a server-based files and tasks brokerage. In response to receiving a request from a requesting computing device, the server posts the request to a request queue. The request is for a requested mobile telephonic device to perform a task. The server posts a first notification to a first notification queue, in response to receiving the request. The server pushes the first notification to the requested device upon confirming a connection. Upon detecting a first condition of the task being for the requested device to receive a file, the server transfers the file from a file repository. Upon detecting a second condition of the task being for the requested device to send a file, the server transfers the file to the file repository. In response to confirming task completion, the server posts a second notification to a second notification queue associated with the requesting device.

SUMMARY

In one aspect, a system enables user interaction with one or more remotely executing mobile applications. The user interaction may occur from a vehicle. The system may include at least one computer at a vehicle and includes a human machine interface (HMI) for control by a vehicle occupant. The computer may be a vehicle computer and/or a nomadic device.

An application server executing one or more mobile applications remote from the vehicle may communicate with the at least one computer over a communication network. The mobile applications may be configured to receive inputs from and transmit outputs to the at least one computer.

Additionally, an HMI application may execute on the at least one computer. The HMI application may include instructions for providing one or more services of the HMI to the mobile applications thereby enabling the exchange of inputs and/or outputs to the mobile applications executing remotely from the vehicle. Accordingly, vehicle-based operation of the one or more mobile applications may be enabled from the at least one computer via the HMI.

The HMI may include, but is not limited to, a microphone, one or more sets of vehicle speakers, one or more in-vehicle buttons, one or more in-vehicle displays, an audio channel on a nomadic device, one or more BLUETOOTH profiles, and/or speech recognition.

In some embodiments, the one or more mobile applications may be associated with one or more application profiles. These application profiles may be associated with a mobile identification number, a vehicle identification number, or both.

In some embodiments, the HMI server may also be a data relay.

In another aspect, one or more application events which may define a request for input (e.g., tactile inputs or vocal inputs) from or an output transmission (e.g., speech, audio, video, text or graphics) to a computer at the vehicle (e.g., a vehicle computer and/or a nomadic device) may be received. The applications events may be from one or more mobile applications executing on one or more application servers which may be remote from a vehicle. The at least one computer at the vehicle may have a human-machine interface (HMI) for control by a user.

Further, the provision of one or more services of the HMI of the at least one computer to the one or more mobile applications may be facilitated in response to the request for input or the output transmission. Using the HMI of the at least one computer, vehicle-based operation of the one or more mobile applications may be enabled.

In some embodiments, application profiles may be associated with the one or more mobile applications. Authentication credentials (e.g., and without limitation, a mobile identification number, a vehicle identification number, or both) may be used in order to identify the application profiles. If an application profile is identified, use of the one or more mobile applications associated with the application profile may be enabled.

In another aspect, a system may have at least one computer in a vehicle. The computer may be configured to communicate with a server storing mobile applications outside of the vehicle. Service of the vehicle's microphone or speakers may be provided to the mobile applications for verbal input (e.g., and without limitation, via the microphone) to the mobile applications or presenting output (e.g., and without limitation, via the speakers) from the mobile applications. The computer may be further configured to enable mobile application operation via the input from and the output to the computer.

In some embodiments, the mobile applications may be a client and the computer may be a server with respect to provision of the services of the vehicle's microphone or speakers.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

User applications that are operated from a user terminal can be stored on a remote server accessible via a network connection, such as (and without limitation) the Internet. Such operability is sometimes referred to as "cloud computing." Similarly, mobile applications can be stored on a remote server. A vehicle occupant should be able to interact with these remotely stored mobile applications using the human machine interface (HMI) of a vehicle infotainment system.

Figure 1:
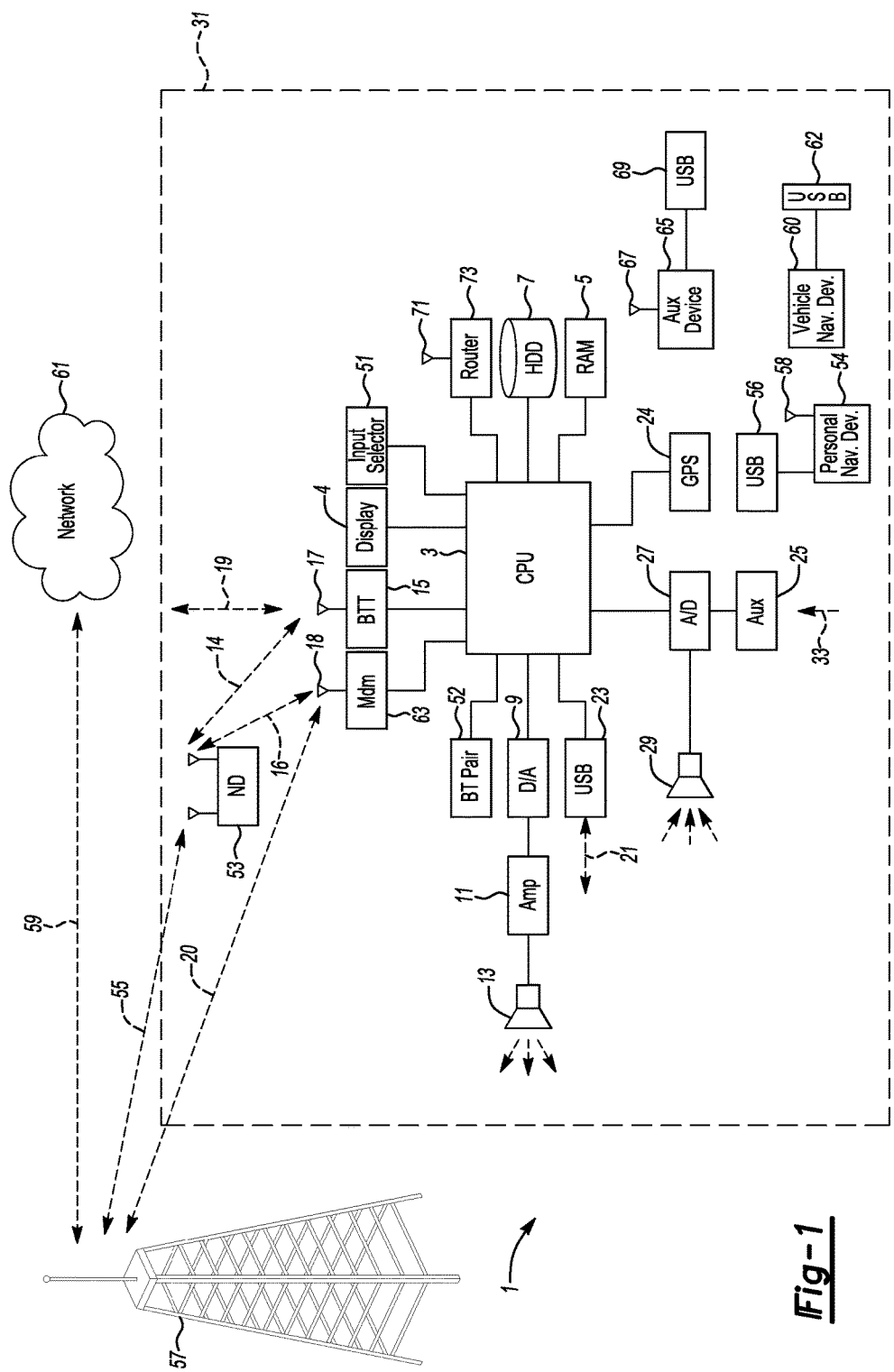
FIG. 1 an exemplary illustration of vehicle computing system according to one of the various embodiments.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
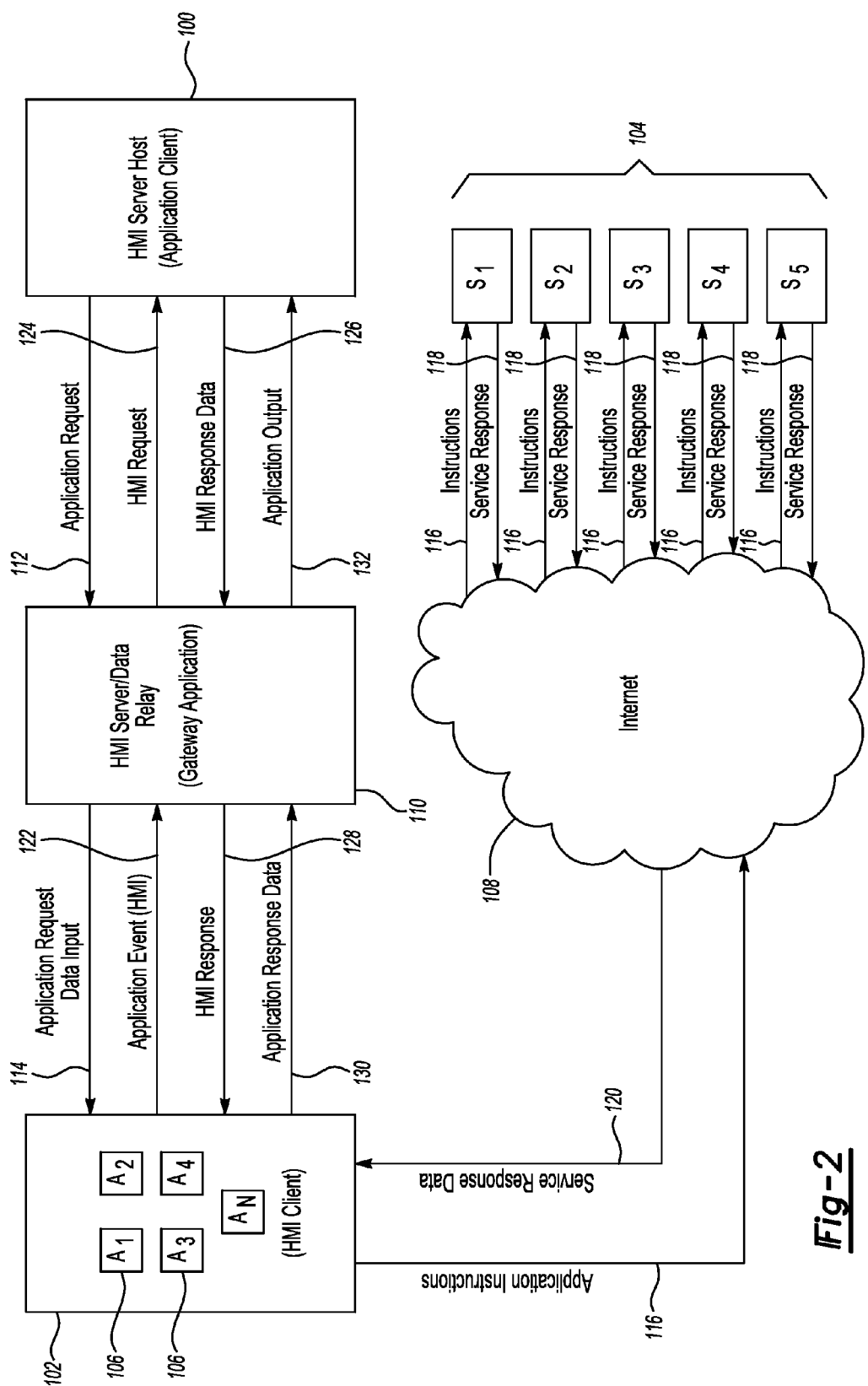
FIG. 2 is a block diagram of a system enabling vehicle-based operation of one or more mobile applications executing on one or more remote computing systems.

The VCS 1 can be used by a vehicle occupant to operate mobile applications that are stored on a device located remotely from the vehicle. For example, the applications can be stored on a remote computing system, e.g., an application/web server 102, that is accessible via a network (e.g., Internet) connection. FIG. 2 illustrates the system architecture which enables the use of such mobile applications.

A server 102 (which may, in some embodiments, be an application and/or web server) may store one or more mobile applications 106 (illustrated in FIG. 2 as "$A_1$," "$A_2$," "$A_3$," "$A_4$" ... "$A_N$") which provide access to and the use of one or more remote services 104 (illustrated in FIG. 2 as "$S_1$," "$S_2$," "$S_3$," ... "$S_N$"). In some embodiments, these services may be web-based services. These services 104 may include, but are not limited to, electronic mail, radio streaming, movie streaming, social networking, news, search engines, and the like. The mobile applications 106 may be installed to and stored on the server 102 according to well-known methods in the art. In some embodiments, the server 102 may be operated by an OEM.

Server 102 may be both an application server and a web server. It will be appreciated that, in some embodiments, the server 102 may be an application server only and a separate web server may be in communication with the application server. The web server may be used to communicate with the one or more web services 104 over the Web using an Internet connection 108. Thus, FIG. 2 may be re-arranged and modified according to a specific implementation without departing from the scope of the invention. Further details of the communication between server 102 and services 104 will be described below.

A gateway application or HMI server 110 may be installed and executing on the VCS 1 and/or the nomadic device 53. The HMI server 110 may be an application that serves or remotes the services/facilities of the human machine interface (HMI) of the VCS 1 and/or ND 53 to the mobile applications 106. It should be understood that the HMI services/facilities may comprise the services of the VCS 1 alone, the ND 53 alone, or the collective HMI services of the VCS 1 and the ND 53. Accordingly, with respect to the operation of the HMI server 110, the VCS 1 and the nomadic device 53 will be collectively referred to herein as the HMI server host 100.

The applications 106 may be operated irrespective of the programming environment of the HMI server host 100. For example, and without limitation, the programming language of the application(s) 106 may be different than the language in which the HMI server host 100 operates or is programmed.

In operation of the mobile applications 106, the VCS 1 may be the client receiving the service 104 via application 106 while the application server 102 is the server which serves the services 104 to the VCS 1. However, during operation, the VCS 1 may also be a HMI server host hosting the HMI server 110, which obtains and provides access of the HMI facilities to the applications 106, while the applications 106 are the HMI client being given access to the HMI facilities.

As briefly described above, the HMI server 110 may be additionally or alternatively installed on and executed from the ND 53. In this case, the HMI server 110 may be programmed to be compatible with different ND 53 makes and models. With current mobile application use, each mobile application may be programmed/configured according to the type of nomadic device on which it is being executed. The mobile applications 106 on the server 102, however, may be used from an ND of any make or model because the applications are programmed to operate with the VCS 1 rather than based on the ND type via the HMI server 110. Thus, the applications 106 are programmed/written for operation through the VCS 1 and, therefore, are scalable and have a simple deployment model by being stored on the server 102. Of course, these advantages hold true as well if the HMI server 110 is stored/programmed to the VCS 1. Other non-limiting advantages of this model may include, but are not limited to, increased hardware performance, lower memory consumption of the VCS 1 and/or ND 53, and increased security (e.g., applications are "trusted applications" because they are hosted on a monitored server, e.g., by an OEM). This model also facilitates concurrent use of multiple applications 106 while maintaining system performance.

In some embodiments, the gateway application 110 may also serve as a data relay or "dumb pipe" for exchanging data, such as inputs, outputs, instructions, VCS credentials, and user credentials, between the applications 106 and the VCS 1. Thus, operation instructions and commands from the VCS 1, and outputs from the applications 106, may be exchanged by and through the data relay 110. Accordingly, the HMI server/data relay 110 may be both an HMI services broker and a data broker.

It will be appreciated that the HMI server 110 may be executed on the ND 53 and/or VCS 1 along with mobile applications that may be loaded to the ND 53 and/or VCS 1. Accordingly, the operation of the HMI server 110 does not interfere with the operation of mobile applications loaded to the ND 53 and/or VCS 1. In some embodiments, both the mobile applications 106 and the mobile applications on the ND 53 and/or VCS 1 may be used concurrently via the VCS 1.

Figure 3:
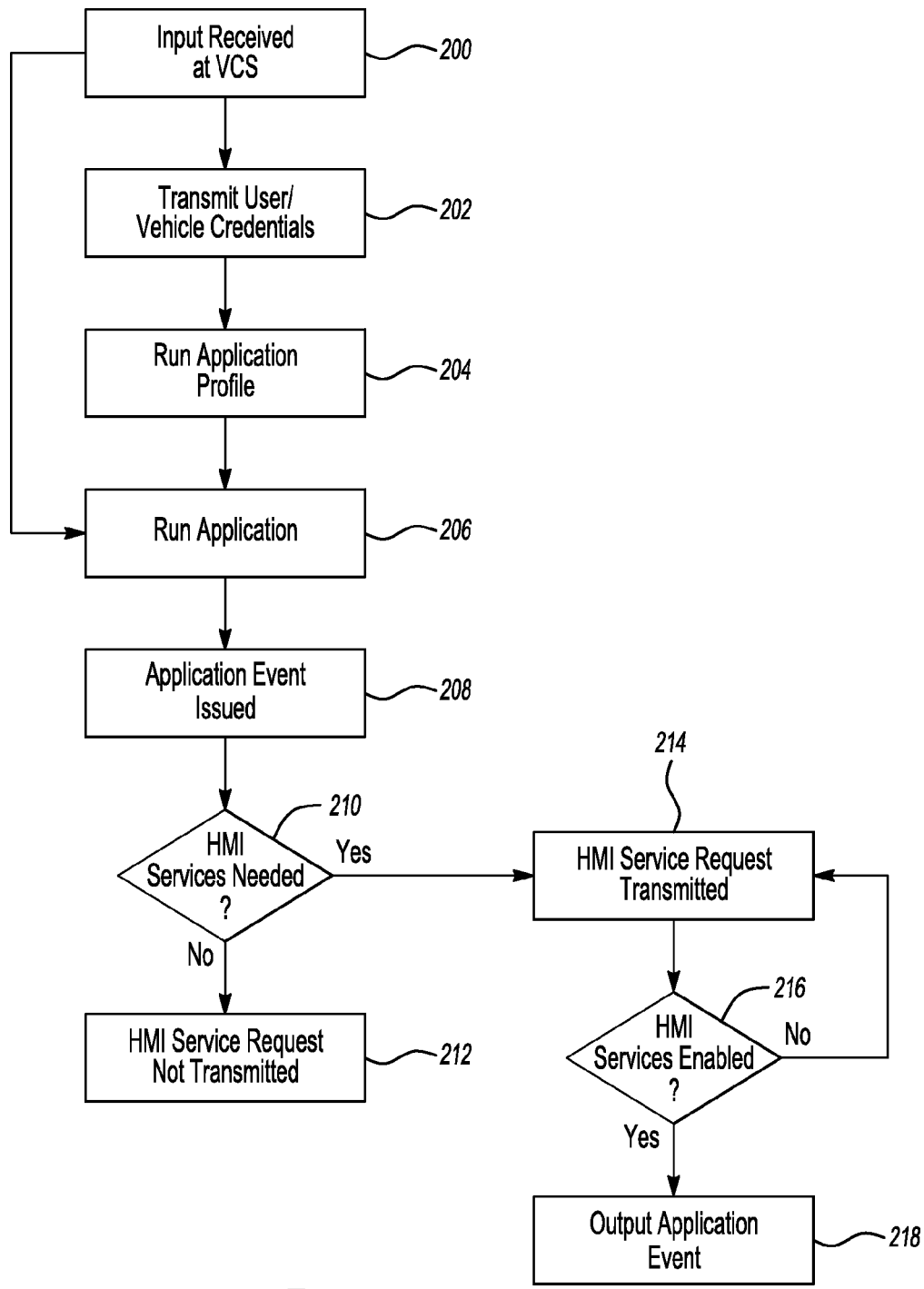
FIG. 3 is a process for operating from a vehicle computing system one or more mobile applications executing on one or more remote computing systems.

Further details of the operation will now be described with respect to both FIGS. 2 and 3. As illustrated in block 200, one or more commands/instructions may be issued by the user via one or more inputs from the VCS 1 to operate the applications 106. Inputs may include, but are not limited to, tactile and vocal inputs. Non-limiting examples may include, but are not limited to, button presses (including capacitive buttons and touch-screen buttons) and/or spoken commands. These inputs may be received by the HMI server/data relay 110, along with user credentials, and transmitted (data arrow 112) to the server 102 (block 202). User credentials may be used to authenticate the user and/or the vehicles as authorized users of the applications 106.

In one embodiment, the server 102 may store the applications in application profiles according to a vehicle identifier, such as a VIN, or a user identifier, such as a mobile identifier number (MIN). Other user credential may also be stored (such as, and without limitation, user provided credentials). Each application profile may identify the application(s) available to the vehicle or the user. Each vehicle and/or user may be associated with one or multiple application profiles. Thus, the user credentials may include the VIN and/or the MIN.

In another embodiment, there may be a multi-level authentication. For example, the VIN and an identifier associated with the vehicle occupant (such as the MIN) may be used to authenticate application use. By way of example and not limitation, the VIN may be used to identify/authorize access to the application profile(s) associated with the vehicle, and the MIN may be used to identify the vehicle occupant as an authorized user of the applications 106. Thus, multiple conditions may be required to be satisfied for a vehicle occupant to operate the applications 106. As another example, the application profiles may be associated with the user identifier (e.g., MIN). In this case, the authentication may include authorizing the user (e.g., testing that the MIN is associated with the VIN) and, if so, then authorizing access to the applications 106 in the application profile associated with the MIN.

It will be appreciated that the applications 106 may or may not be stored as application profiles. In this case, the vehicle occupant may receive information on the applications stored on the server 102 (e.g., and without limitation, as a list), but permitted to access those applications that the vehicle occupant is authorized to use. The use of applications may be authorized when the vehicle occupant registers with a web-based service 104. Accordingly, as a further example of a multi-step authentication scheme, if there is a match between the MIN and the VIN, then a further test may be conducted to confirm that the vehicle occupant is authorized to access one or more applications based on the MIN or VIN.

A vehicle occupant may associate one or multiple MINs with a VIN. Thus, for example, each member of a family with a mobile phone may access applications when in a vehicle having the associated VIN. Alternatively or additionally, a vehicle occupant may associate one or more VINs with a MIN. Thus, for example, a vehicle occupant can access one or more applications in different vehicles. As another example, the vehicle occupant can customize application use for different vehicles. By way of example and not limitation, a parent may customize applications in an applications profile to be geared toward use by children when the parent is driving the family minivan. Thus, music streaming applications may play children songs or video streaming applications may stream children's movies. However, the parent may customize another application profile to be used when the parent is alone or with other adults. The profile may include electronic mail applications, news applications, adult radio applications, and the like.

These user/vehicle identifier associations may be stored in a user profile. For example, after the user purchases or acquires a FORD vehicle, the user may create such a profile on www.syncmyride.com from which they may also download the HMI server/data relay 110 to the VCS 1 and/or ND 53. Once created, the user profile may be stored locally (e.g., on the ND 53 and/or VCS 1) or remotely (e.g., on the server 102).

When the application request data input 114 (e.g., command/instructions, credentials, etc.) is received at the server 102, the user/vehicle may be authorized. Once authorized, the application profile(s) may be activated/run (block 204) and/or the application(s) may be run and/or operated (block 206). It will be appreciated that user/vehicle authorization may occur at application startup and/or at the start of a new user session and not again until the application is started up again and/or a new session is started. A user session may be defined by login and logout of an application. A login/logout may be defined by a vehicle key-on/key-off and/or a user input login/logout (e.g., a voice command and/or a tactile command such as a button press). Accordingly, after a vehicle occupant begins use of an application, the authorization/authentication process, including transmission of credentials (block 202) and/or authorizing use of the application profile(s) (block 204), may not occur with each subsequent user input. Thus, as illustrated in FIG. 3, the application(s) may be run/operated (block 206) in response to an input received at the VCS 1 (block 200).

When an application is run/operated, application instructions (data arrow 116) may be sent to a service 104 over the network 108 (e.g., the Internet) based on the input from the vehicle 31. It will be appreciated that, in some embodiments, each application 106 may be associated with a web-based service 104. Further, each web-based service 104 may be a separate business entity.

A service response (data arrow 118) may be issued by the service 104 and transmitted to the server 102 as a service data response (data arrow 120). The application 106 may receive the service response data to issue as an application event (data arrow 122) (block 208). An application event may include instructions/requests for further input or outputs for presentation at the VCS 1. Input instructions/requests may include, but are not limited to, tactile inputs (such as button presses, touchscreen inputs, capacitive inputs, etc.) and/or vocal inputs. Outputs may include, but are not limited to, speech, audio, video, text (such as messages, news, and the like), graphics, and the like.

The application event may be transmitted from the application 106 and received by the HMI server 110 (data arrow 122). In other embodiments, the HMI server 110 may monitor the applications 106 for application events requesting access to the HMI services. When a request is detected, the HMI server 110 may receive the request. In one embodiment, the VCS 1 and/or ND 53 publish the services that are available to the applications 106 (via the HMI server 110) and the application 106 subscribe for access to the services.

As part of the HMI server 110 monitoring the applications 106, a determination is made whether HMI services are needed (block 210). In some embodiments, a further determination may be made of which specific service may be needed. Of course, in some embodiments, the determination in block 210 may not be made because HMI services may always be needed. If HMI services are not needed, then a request for HMI services is not transmitted to the HMI server host 100 (block 212).

However, when the application 106 issues a request for HMI services, and it is received by the HMI server 110 as a request for HMI services, the HMI server 110 transmits a request (data arrow 124) to the HMI server host 100 for the requested service (block 214). The following examples are illustrative:

EXAMPLE 1

The service response requires vocal input by the vehicle occupant. Thus, the application event may include instructions/request to open microphone 29. The HMI server 110 may receive this request and transmit instructions for the microphone 29 to activate and begin listening.

EXAMPLE 2

The service response requires the vehicle occupant to input an acknowledgment. Thus, the application event may include instructions/request to receive a button press. The HMI server 110 may receive this request and transmit instructions to the HMI server host 100 that a button press is required.

EXAMPLE 3

The service response includes output for presentation at the VCS 1. For example, the output may include a video display. The application event may include instructions/request that the display 4 is needed. The HMI server 110 may receive this request and transmit instructions/request to the HMI server host 100 that the services of the display 4 are required.

EXAMPLE 4

The service response includes an audio output. The application event may include a request for the native media player on the ND 53. The HMI server 110 may receive the request and transmit instructions to the ND 53 to activate the media player. In some embodiments, the instructions may also include instructions to use the ND's 53 hands-free profile (HFP) over which the audio may be streamed. Thus, the instruction may require both the media player and the HFP to be activated.

In some embodiments, the instructions may also include instructions to the user to perform the action. For example, when an instruction is sent to an HMI service, a further instruction may be sent to notify the user that an action is required. Thus, when a button press acknowledgment is needed, the HMI server 110 may also send instructions to the VCS 1 to output an audible request (e.g., a beep, tone, or a spoken request) for the user to press the button. For example, a spoken request may be "please enter a command." Another audible request may be a beep or chime defining that input is required from the user. The VCS 1 may include software or programming used for outputting the verbal/audible request.

The requested HMI service(s) may or may not be enabled after the instructions have been transmitted (block 216). If the HMI service(s) have not been enabled, the HMI service request may be re-transmitted (block 214).

If the service(s) have been enabled, HMI response data (arrow 126) may be sent to the HMI server 110. The HMI server 110 may transmit this data as an HMI response signifying that the service(s) have been enabled (arrow 128). The application data may then be transmitted (arrow 130) to the VCS 1 via the HMI server 110.

As illustrated in block 218, the output may be transmitted to VCS 1 (arrow 132) for presentation at the VCS 1.

It will be appreciated that the application data (arrow 130) and the output (arrow 132) may not be transmitted until an output is available from the service(s) 104. In this case, the application events (arrow 122), HMI requests (arrow 124), HMI response data (arrow 126), HMI response (arrow 128), application instructions (arrow 116), service response (arrow 118), and service response data (arrow 120) may continue to be exchanged until an output is received. This process may continue until the application and/or session is terminated.

Thus, the illustration and description of FIG. 2 is provided for clarity and illustration and should not be considered limiting. Further, the arrangement and description of FIG. 2 and FIG. 3 may be modified and re-arranged to fit a particular implementation without departing from the scope of the invention.

The following non-limiting examples are illustrative of the various embodiments. The following aspects apply to the scenarios: The application server 102 includes multiple applications including, but not limited to, an email program (e.g., GMAIL) and an Internet Radio program (e.g., PANDORA). These applications have been configured to operate with (i.e., receive inputs from and transmit outputs to) the VCS 1. Driver A and Passenger B want to operate at least one of these applications in a vehicle.

EXAMPLE 1

Gmail

Driver A inputs a vocal command to his VCS 1 to start GMAIL. The request is sent, via the HMI server/data relay 110, to the GMAIL application stored on the application server 102. A connection with the GMAIL service 104 to Driver A's account is made using the user and/or vehicle credentials. Driver A wants to create and send an email. Driver A verbally inputs the request through the VCS 1 which is transmitted to the GMAIL service. Since the GMAIL application 106 cannot communicate directly with the VCS 1, although it is configured to operate with the VCS 1 (e.g., and without limitation, converting speech to text), the GMAIL application transmits an application event for the microphone on the VCS 1. In response to the gateway application 110 transmitting the request to the VCS 1, the microphone 29 is opened to receive verbal inputs for transmission to the application 106 via the gateway application 110. Driver A may verbally create the email and submit a verbal "send" command to send the email.

EXAMPLE 2

Pandora

Driver A and Passenger B, who has a PANDORA subscription, have been listening to music in Driver A's vehicle. Prior to playing music from PANDORA, the application 106 issued an application event for a media player because PANDORA does not have direct communication with the HMI (i.e., the VCS 1 or the ND 53). The gateway application 110 transmits a request to the ND 53 to activate the hands-free profile (for streaming the music to the VCS 1) and the media player (to play the music). Inputs (such as track changes) are transmitted via the HMI server 110 to the PANDORA application 106.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:
1. A system comprising:
   a vehicle-installed computer including a human machine interface (HMI) and HMI gateway application;
   a remote application server, storing application profiles for each of a plurality of vehicles defining applications accessible to each of a plurality of vehicles, in communication with the vehicle-installed computer, and configured to execute the applications;

an HMI application executing on the computer, wherein the vehicle installed computer is configured to:

receive, at the HMI gateway application, input requests from the mobile applications executing remotely;

receive input to the HMI; and transfer the input to the HMI gateway application; and via the HMI gateway application, enable operation of the mobile applications based on the received input.

2. The system of claim 1 wherein the HMI is selected from the group consisting of a microphone, one or more sets of vehicle speakers, one or more in-vehicle buttons, and one or more in-vehicle displays.

3. The system of claim 1 wherein the HMI is selected from the group consisting of an audio channel on a nomadic device, one or more BLUETOOTH profiles, and speech recognition.

4. The system of claim 1 wherein the application profiles are associated with a mobile identification number, a vehicle identification number, or both.

\* \* \* \* \*